United States Patent
Anderson et al.

(10) Patent No.: US 8,402,530 B2
(45) Date of Patent: Mar. 19, 2013

(54) DYNAMIC LOAD REDISTRIBUTION AMONG DISTRIBUTED SERVERS

(75) Inventors: Odin J. Anderson, Bellevue, WA (US); Stephen M. Patrick, Sammamish, WA (US); Nasko Oskov, Kenmore, WA (US); Konstantin E. Ryvkin, Kenmore, WA (US); Guruprakash Bangalore Rao, Redmond, WA (US); Balasubramanian Swaminathan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 319 days.

(21) Appl. No.: 12/847,363

(22) Filed: Jul. 30, 2010

(65) Prior Publication Data

US 2012/0030749 A1 Feb. 2, 2012

(51) Int. Cl.
*G06F 9/00* (2006.01)
*G06F 15/16* (2006.01)
*G06F 17/00* (2006.01)
*G06F 15/173* (2006.01)
*G06F 9/46* (2006.01)
*H04L 29/06* (2006.01)

(52) U.S. Cl. .......... 726/12; 713/150; 709/226; 718/105; 726/14

(58) Field of Classification Search ............ 726/12
See application file for complete search history.

(56) References Cited

U.S. PATENT DOCUMENTS

| | | | |
|---|---|---|---|
| 6,460,141 B1 * | 10/2002 | Olden | 726/4 |
| 6,658,473 B1 * | 12/2003 | Block et al. | 709/226 |
| 7,054,931 B1 * | 5/2006 | Candan et al. | 709/226 |
| 7,072,960 B2 * | 7/2006 | Graupner et al. | 709/223 |
| 7,444,459 B2 * | 10/2008 | Johnson | 711/6 |
| 7,657,940 B2 | 2/2010 | Portolani et al. | |
| 7,823,196 B1 * | 10/2010 | Caldwell et al. | 726/15 |
| 7,844,713 B2 * | 11/2010 | Ikawa et al. | 709/227 |
| 7,877,509 B2 * | 1/2011 | Dhupelia et al. | 709/239 |
| 8,140,652 B2 * | 3/2012 | Calo et al. | 709/221 |
| 8,176,495 B2 * | 5/2012 | Sen et al. | 718/105 |

(Continued)

FOREIGN PATENT DOCUMENTS

WO  WO2008/014004 A2  1/2008

OTHER PUBLICATIONS

A Distributed Light-Weight Authentication Model for Ad-hoc Networks—Published Date: Dec. 6, 2001 http://www.crypto.rub.de/imperia/md/content/texte/adhocauth.pdf (14 pages).

(Continued)

*Primary Examiner* — Carolyn B Kosowski
(74) *Attorney, Agent, or Firm* — Workman Nydegger (57) ABSTRACT

Authentication requests are redistributed among a plurality of authentication servers and to centrally managing authentication affinities among distributed servers using a secure channels affinity service. A computer system instantiates a secure channel management service configured to manage secure channel connections. The secure channel management service receives state inputs from currently deployed authentication servers. The authentication servers may be configured to queue authentication requests for transmission to authentication servers. The computer system determines that, based on the received state input, at least one of the secure channels is to be remapped to a different authentication server. The computer system also remaps the determined secure channels to distribute future authentication requests among the authentication servers. In some cases, the current state of an authentication proxy server is embedded in communications transmitted by the authentication server, such that the secure channel connections are managed using the embedded state information.

20 Claims, 4 Drawing Sheets

U.S. PATENT DOCUMENTS

| | | | |
|---|---|---|---|
| 8,176,538 B2 * | 5/2012 | Kigo et al. | 726/8 |
| 2004/0068573 A1 * | 4/2004 | Corbeil | 709/229 |
| 2006/0005237 A1 * | 1/2006 | Kobata et al. | 726/12 |
| 2007/0107048 A1 | 5/2007 | Halls et al. | |
| 2007/0198721 A1 * | 8/2007 | Ikawa et al. | 709/226 |
| 2007/0214265 A1 * | 9/2007 | Zampiello et al. | 709/226 |
| 2007/0289007 A1 * | 12/2007 | Tanaka et al. | 726/12 |
| 2008/0031496 A1 | 2/2008 | Takagi | |
| 2008/0071911 A1 * | 3/2008 | Holbrook et al. | 709/226 |
| 2008/0141264 A1 * | 6/2008 | Johnson | 718/105 |
| 2008/0235511 A1 | 9/2008 | O'Brien et al. | |
| 2009/0265467 A1 * | 10/2009 | Peles | 709/226 |
| 2009/0328054 A1 * | 12/2009 | Paramasivam et al. | 718/105 |
| 2010/0036956 A1 * | 2/2010 | Nishikawa | 709/226 |
| 2010/0058451 A1 * | 3/2010 | Paramasivam et al. | 726/7 |
| 2010/0088410 A1 * | 4/2010 | Ridley | 709/224 |
| 2010/0251258 A1 * | 9/2010 | Hanamori et al. | 718/105 |
| 2012/0030749 A1 * | 2/2012 | Anderson et al. | 726/12 |
| 2012/0266179 A1 * | 10/2012 | Osborn et al. | 718/105 |

OTHER PUBLICATIONS

Distributed authentication for low-cost wireless networks—Published Date: 2008 http://www.cs.ucdavis.edu/~hchen/paper/hotmobile08.pdf (5 pages).

Extensible Pre-Authentication in Kerberos—Published Date: 2007 http://www.acsac.org/2007/papers/30.pdf (10 pages).

* cited by examiner

DYNAMIC LOAD REDISTRIBUTION AMONG DISTRIBUTED SERVERS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. Often, in order to interact with other computers systems, authentication schemes are put into place which ensure that the application user is authorized to connect to the other computer system. Many different types of authentication are in use and new methods are continually springing up. One type of authentication is NT LAN Manager or NTLM.

NTLM is typically used in scenarios where software applications and/or users (i.e. consumers) are connecting to other computer systems remotely. Such consumers typically establish a secure channel to a remote computer system or to a proxy server which establishes a secure channel to the remote computer system. An affinity mapping may be established between the consumer and one of the proxy servers. However, over time, the affinity mapping may change and consumers may begin connecting to different proxy servers. In some cases, this may result in a disproportionate amount of consumers connecting to a given proxy server.

BRIEF SUMMARY

Embodiments described herein are directed to redistributing authentication requests among a plurality of authentication servers and to centrally managing authentication affinities among distributed servers using a secure channels affinity service. In one embodiment, a computer system instantiates a secure channel management service configured to manage secure channel connections. The secure channel management service is configured to receive state inputs from currently deployed authentication proxy servers. The authentication proxy servers may be configured to queue authentication requests for transmission to authentication servers. The computer system determines that, based on the received state input, at least one of the secure channels are to be remapped to a different authentication proxy server. The computer system also remaps the determined secure channels to distribute future authentication requests among the authentication proxy servers.

In another embodiment, a secure channels affinity service receives an indication of authentication demand at various different authentication servers. The secure channels affinity service determines that authentication affinities of the authentication servers are to be altered according to the received indication of authentication demand. The secure channels affinity service also dynamically changes the authentication affinities of the authentication servers based on the received indication of authentication demand.

In still another embodiment, a computer system receives a state input embedded in a communication from at least one of the currently deployed authentication proxy servers. The authentication proxy servers may be configured to queue authentication requests for transmission to other authentication servers. The state input may include at least one of the following: a total number of consumers, a number of consumers currently authenticating through the authentication proxy servers in the domain, a total number of proxy servers, the proxy servers' current processing capacity and an affinity mapping between the consumer servers and the authentication proxy servers. The computer system presents to a user an option to select from various available authentication servers, where the available authentication servers are identified based on the received embedded state input. The computer system also remaps the secure channels based on the user's selection to distribute future authentication requests among the plurality of authentication proxy servers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to redistributing authentication requests among a plurality of authentication servers and to centrally managing authentication affinities among distributed servers using a secure channels affinity service. In one embodiment, a computer system instantiates a secure channel management service configured to manage secure channel connections. The secure channel management service is configured to receive state inputs from currently deployed authentication proxy servers. The authentication proxy servers may be configured to queue authentication requests for transmission to authentication servers. The computer system determines that, based on the received state input, at least one of the secure channels are to be remapped to a different authentication proxy server. The computer system also remaps the determined secure channels to distribute future authentication requests among the authentication proxy servers.

In another embodiment, a secure channels affinity service receives an indication of authentication demand at various different authentication servers. The secure channels affinity service determines that authentication affinities of the authentication servers are to be altered according to the received indication of authentication demand. The secure channels affinity service also dynamically changes the authentication affinities of the authentication servers based on the received indication of authentication demand.

In still another embodiment, a computer system receives a state input embedded in a communication from at least one of the currently deployed authentication proxy servers. The authentication proxy servers may be configured to queue authentication requests for transmission to other authentication servers. The state input may include at least one of the following: a total number of consumers, a number of consumers currently authenticating through the authentication proxy servers in the domain, a total number of proxy servers, the proxy servers' current processing capacity and an affinity mapping between the consumer servers and the authentication proxy servers. The computer system presents to a user an option to select from various available authentication servers, where the available authentication servers are identified based on the received embedded state input. The computer system also maps or remaps the secure channels based on the user's selection to distribute future authentication requests among the plurality of authentication proxy servers.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, virtual computers, cloud-based computing systems, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
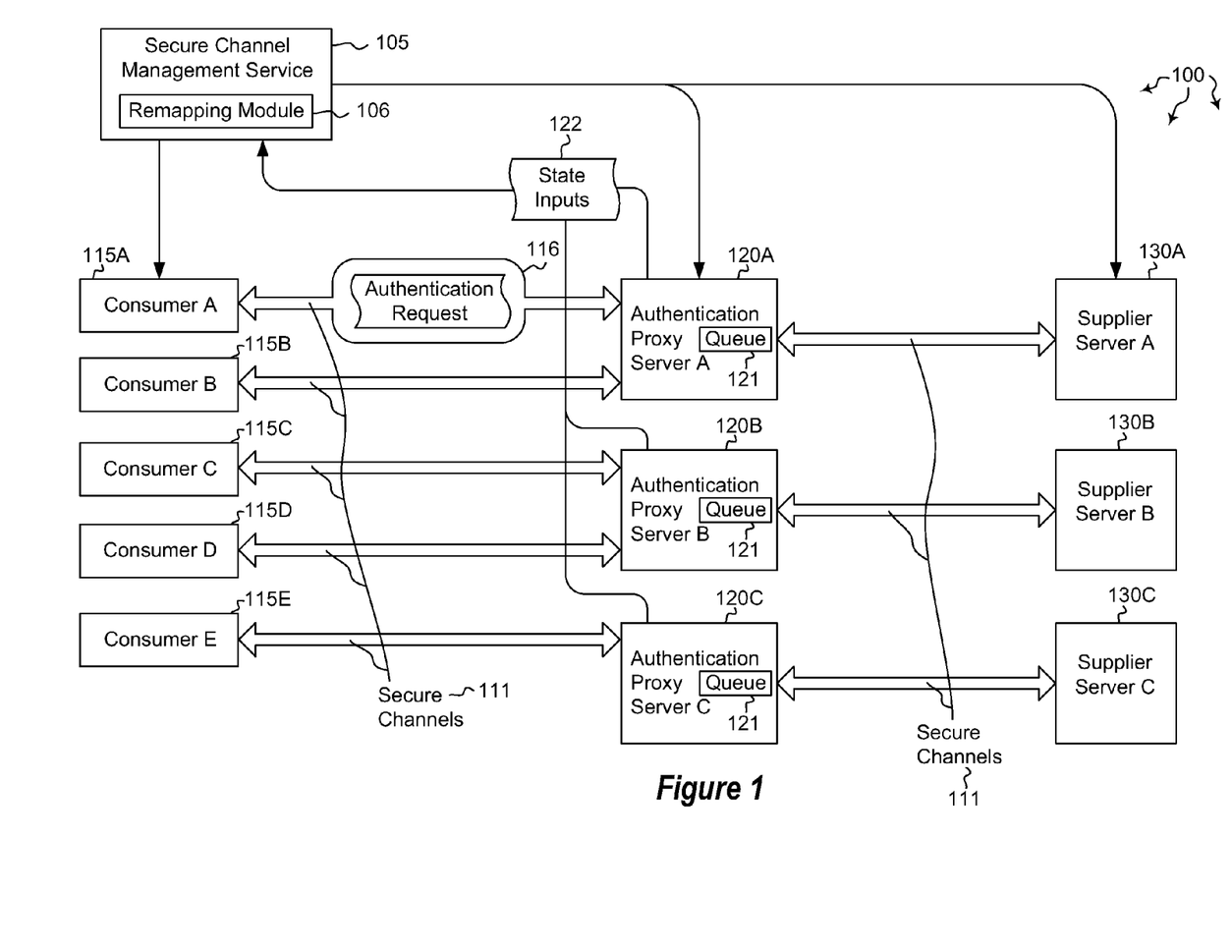
FIG. 1 illustrates a system architecture in which embodiments of the present invention may operate including redistributing authentication requests among a plurality of authentication servers and centrally managing authentication affinities among distributed servers using a secure channels affinity service.

FIG. 1 illustrates a system architecture 100 in which the principles of the present invention may be employed. System architecture 100 includes various different computer systems. As shown in FIG. 1, these computer systems may include multiple different consumer computer systems as well as multiple different authentication proxy servers. It will be understood that while five consumer computer systems and three proxy servers are shown, these numbers are arbitrary and virtually any number or type of computer systems may be used. Consumer computer systems (e.g. 115A-E), as used herein, may refer to end-user or other computer systems that use services. These services may be provided by supplier servers (130A-C). To access the services provided by the supplier servers, the consumers may be routed through authentication proxy servers (120A-C).

In some cases, the authentication proxy servers may be configured to provide services beyond authentication and proxy services. For instance, the proxy servers may be domain controllers. Consumer computer systems (e.g. 115A) may also be domain controllers. Other services such as metering, encryption and virus checking may also be provided by the proxy servers and/or the consumer servers.

Authentication proxy servers may be configured to receive authentication requests (e.g. 116) from the various consumers and route those requests to supplier servers. The authentication proxy servers may authenticate the consumer to the supplier servers, which may remote from or local in proximity to the proxy servers. The communications between the consumers and the authentication proxy servers, as well as the communications between the proxy servers and the supplier servers may be transferred securely using secure channels 111. These channels may implement encryption, various tunneling techniques, virtual private networks (VPNs) or any other method of establishing secure communication between computer systems.

In some embodiments, there may exist many, many consumer computer systems. As such, secure channel management service 105 may be used to route the authentication requests to authentication proxy servers that are able to handle the requests. In some cases, one authentication proxy may have a disproportionate number of consumers sending authentication requests to it. Accordingly, each authentication proxy server may send state inputs 122 to the secure channel management service 105 which indicate each proxy server's current state.

The state inputs may indicate the number of current requests, number of requests processed over a given period of time, total processing capacity, current network usage, number of secure channels currently open, current available processing capacity, configuration settings, and other parameters. In some cases, the state may also include a server's configured limit, where a user has chosen a specific computer to have a higher or lower capacity based upon hardware characteristics or other functional constraints. Using these state inputs, the management service 105 may then implement remapping module 106 to remap various secure channels 111 between the consumers and the authentication proxies, or between the authentication proxies and the supplier, such that those proxies that are best suited to process the consumers' authentication requests are used. These and other concepts will be explained in greater detail below with regard to method 200 of FIG. 2.

Figure 2:
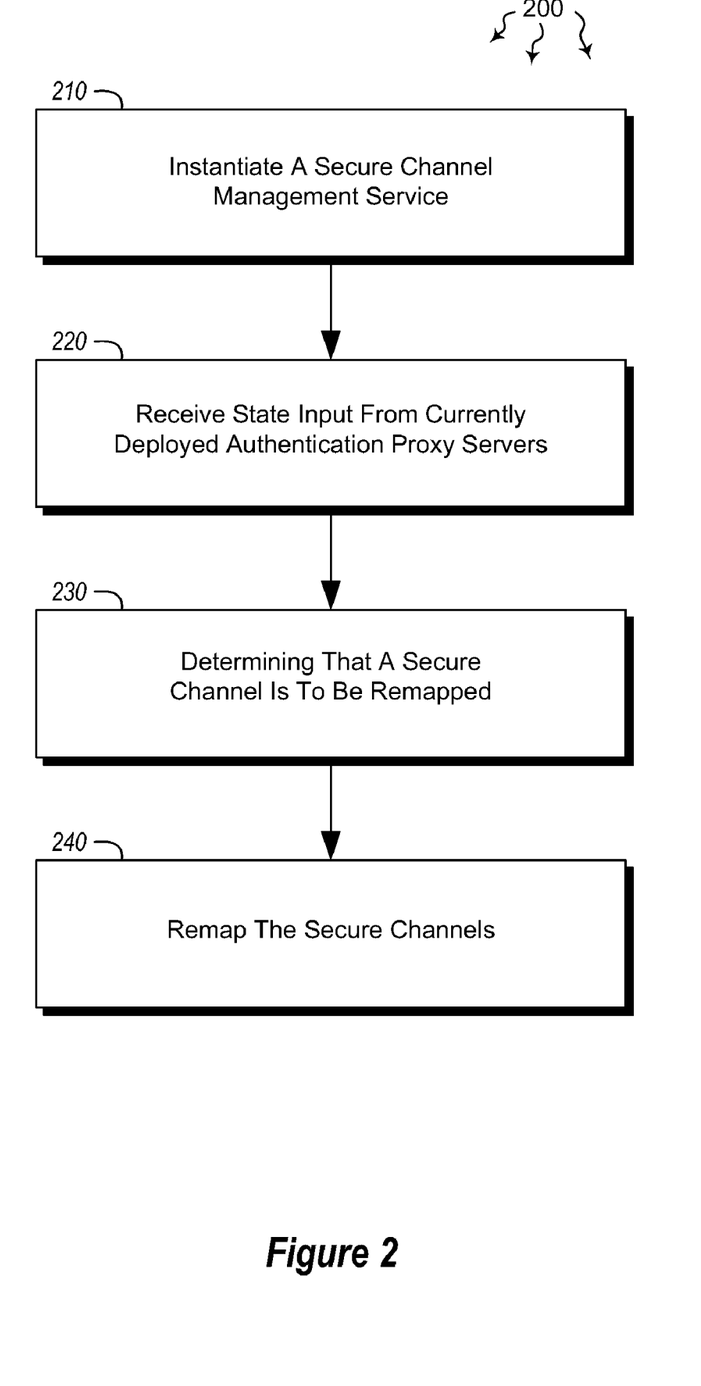
FIG. 2 illustrates a flowchart of an example method for redistributing authentication requests among a plurality of authentication servers.
Figure 3:
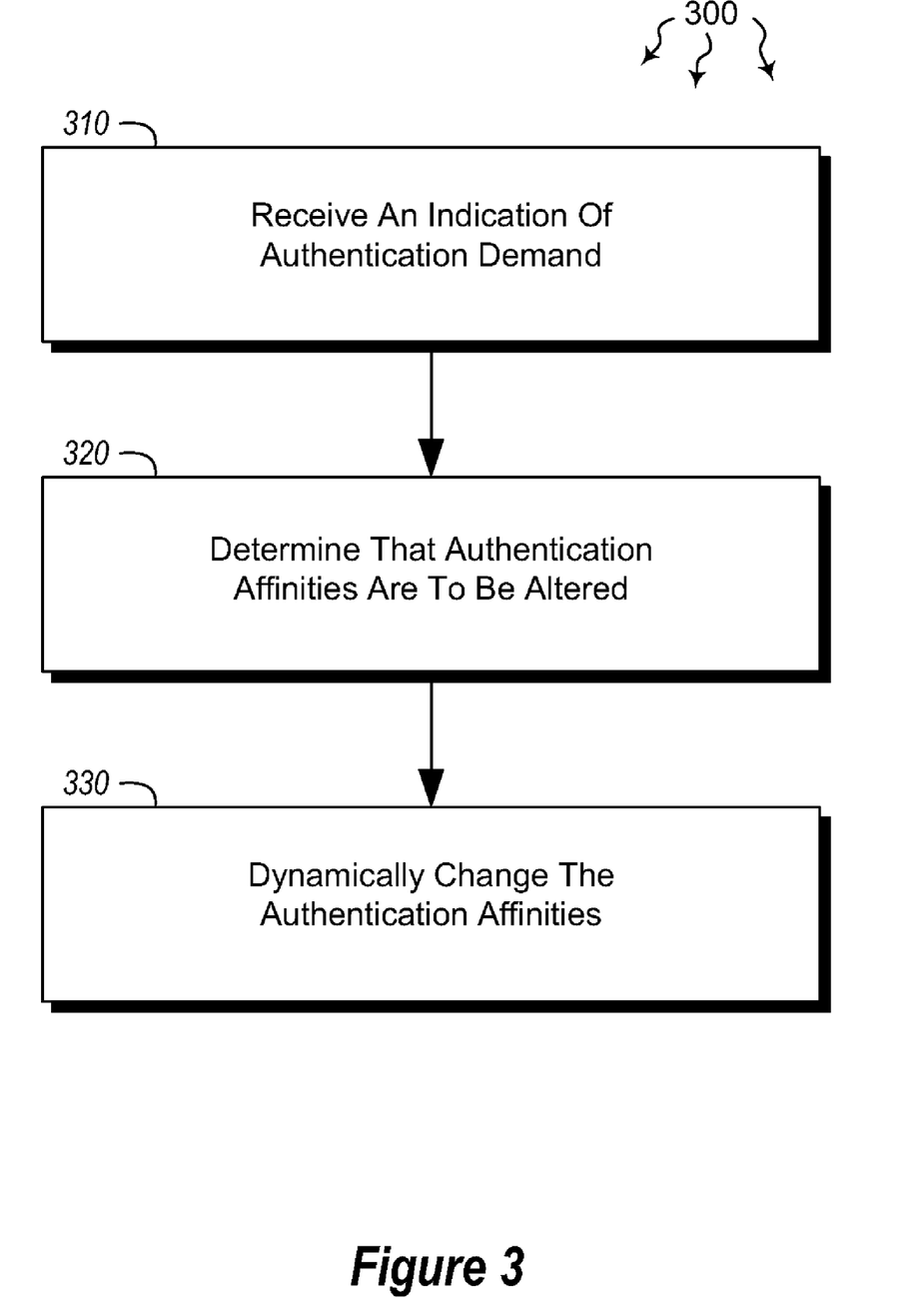
FIG. 3 illustrates a flowchart of an example method for centrally managing authentication affinities among distributed servers using a secure channels affinity service.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for redistributing authentication requests among a plurality of authentication servers. The method 200 will now be described with frequent reference to the components and data of environment 100 of FIG. 1 and environment 400 of FIG. 4.

Method 200 includes an act of instantiating a secure channel management service configured to manage one or more secure channel connections, wherein the secure channel management service is configured to receive state inputs from one or more currently deployed authentication proxy servers (act 210). For example, a computer system may instantiate secure channel management service 105 which manages secure channel connections 111. The secure channel management service may receive state inputs 122 from various different authentication proxy servers (e.g. 120A-C). The secure channel management service 105 may be configured to remap secure channel connections base on the information indicated in the state inputs. For example, if one authentication proxy server is unable or unlikely to handle its pending or future authentication requests, remapping module 106 may remap one or more secure channel connections to different authentication proxy servers. For instance, if a server is determined to be substantially close to a performance threshold, the secure channel may be remapped.

In some embodiments, it should be noted that secure channel management service 105 may be configured to manage secure channels 111 directly between the consumers and the suppliers in cases where no authentication proxy servers are used. Furthermore, in cases where multiple different layers of proxy servers are used (e.g. two, three or more proxy servers between the consumer and the supplier), secure channel management service 105 may be configured to manage secure channels between each of the proxy servers used between the consumer and the supplier. Secure channel management service 105 may additionally be configured to manage the secure channels between the authentication proxy servers and the supplier servers.

Method 200 includes an act of receiving at least one state input from at least one of the currently deployed authentication proxy servers, the authentication proxy servers being configured to queue authentication requests for transmission to one or more authentication servers (act 220). For example, secure channel management service 105 may receive state input 122 from authentication proxy server B (120B). Authentication proxy servers may be configured to queue authentication requests 116 in queues 121. The authentication requests may be queued until the respective authentication proxy server is able to process the request. In some embodiments, the state input received by the secure channel management service may be received from the proxy as a result of the management service's periodic evaluation of the load at each of the proxy. Accordingly, in such cases, the secure channels may be remapped based on an automatically performed periodic evaluation.

In some cases, authentication proxy server 120C may be configured to queue a received authentication request from consumer E (115E) for transmission to supplier server C (130C) over secure channel 111 established between the proxy 120C and the supplier server 130C. The authentication requests may be generated by consumer servers or computer systems requesting authentication on a consumer server. The request for authentication may be a precursor for requesting access to a service provided by the consumer server. Thus, once the user is authenticated to the consumer server, the user can request and receive the service from the consumer server.

As mentioned above, in some embodiments, the authentication proxy servers 120A-C and the consumer servers 115A-E are within a domain. This domain may be managed using a central service (e.g. secure channel management service 105). In some cases, a single instance of secure channel management service 105 may manage several different domains. The management service itself may be configured to run outside of the domain. Thus, the management service 105 may be independent of and run independent of the computer systems of the domain. The management service may communicate with any or all of the computer systems within the domain including receiving communications from and sending communications to each machine. The management service may also be configured to remap or otherwise reconfigure or change the secure channel connections 111. Such changes include establishing new connections, terminating existing connections and modifying various different existing connections.

Figure 4:
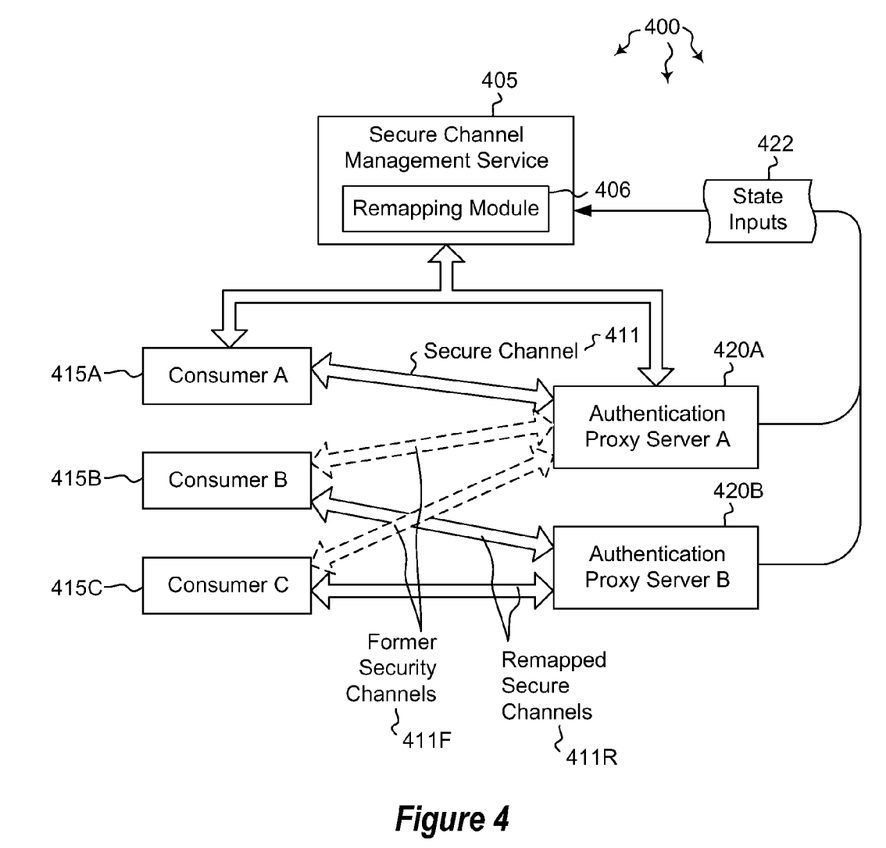
FIG. 4 illustrates an embodiment of the present invention in which authentication requests are redistributed to other authentication proxy servers.

Method 200 also includes an act of determining that, based on the received state inputs, one or more of the secure channels are to be remapped to a different authentication proxy server (act 230). For example, secure channel management service 405 may determine that, based on received state inputs 422, one or more of secure channels 411 are to be remapped to a different authentication proxy server. Thus, as shown in FIG. 4, consumers A, B & C (415A-C, respectively) may (initially) have established secure channel connections to authentication proxy server A (420A). However, after remapping module 406 has performed the remapping based on the received state inputs 422, consumers B & C (415B & 415C) may be remapped to authentication proxy server B (420B) using remapped secure channels 411R. In this case, the former security channels 411F no longer exist and authentication proxy server A no longer processes requests from consumers B & C.

The state inputs, upon which the remappings (i.e. the remapped secure channels) may be based, may include many different kinds of information. At least in some embodiments, an administrator or other user of the management service 405 may select which information is to be provided in the state inputs. In some cases, the state inputs 422 may include the total number of consumers and/or the number of consumers currently authenticating through the authentication proxy servers in a domain. In some cases, the state inputs may include the total number of proxy servers and/or the proxy servers' current processing capacity.

Still further, the state inputs may include an affinity mapping between the consumer servers and the authentication proxy servers. Such an affinity mapping may indicate which proxy servers the consumers are currently set to work with (i.e. which proxy server the consumer is configured to authenticate through). It will be understood by one skilled in the art that many other types of information may be included in the state inputs, in addition to or as an alternative to those types listed herein. Moreover, it will be understood that the current affinity mapping may be received from a consumer server or an authentication proxy server, or both, or from another entity or service that is configured to maintain a current affinity mapping.

In some embodiments, secure channels may be remapped without receiving any state inputs from the authentication proxy servers. For instance, secure channel management service may distribute or remap secure channels between consumers and authentication proxies based on a predetermined remapping method. Such predetermined remapping methods may include "dumb striping" which may distribute an equal (or close to equal) number of secure channels to each authentication proxy, ensuring that each has an equal load, regardless of how many channels each proxy is currently handling.

In some embodiments, the current state of the authentication proxy server may be embedded in communications transmitted by the authentication proxy server. Thus, instead of sending the current state as a separate communication in state inputs 122, each proxy server's current state may be included as part of communications sent to either or both of consumer servers (115A-E) and supplier servers (130A-C). This indication of a proxy server's current state may be used to dynamically adjust the mappings to ensure a proper load on each proxy server. In some cases, the decision of which secure channels to be remapped may be performed dynamically on a continual basis. The remapping may also be performed dynamically, such that the secure channel management service is continually receiving updated state information and is continually remapping the secure channel mappings based on the updated state information.

As indicated above, in cases where the current state of the authentication proxy server may be embedded in communications transmitted by the authentication proxy server, the consumer and proxy (or supplier) may directly negotiate their need and capacity in order to determine an optimal state without implementing secure channel management service 105. In such cases, a consumer may query a set of proxy servers (or suppliers directly (i.e. without going through a proxy)) to obtain their available capacity, after which the consumer may choose the best proxy based upon a variety of remapping algorithms. Such selection or remapping algorithms may include 1) choosing the proxy server (or supplier) with the most available capacity, or 2) choosing the proxy server with least capacity that will accommodate the consumer's expected load.

In some cases, the decision of which secure channels are to be remapped to different authentication proxy servers is performed at predefined intervals. Accordingly, every X (variable) number of seconds, minutes, days, etc., the secure channel management service may look at the current state of the authentication proxy servers and remap the secure channels. This predefined interval may be configured by a user and may be changed as desired by the user. Additionally or alternatively, the decision of which secure channels to remap may be performed after receiving an alert. For instance, the secure channel management service may receive an indication that at least one of the authentication proxy servers has reached a processing capacity threshold.

Thus, for example, as shown in FIG. 4, authentication proxy server A (420A) may indicate in state inputs 422 that it has reached a processing capacity threshold. This threshold may be set by a user, by an administrator or by the authentication proxy server itself. In some cases, the processing threshold may be configured to change, such as when it is processing another task, its threshold capacity for a current task may be lower while it is processing the other task. This threshold processing capacity may thus vary dynamically as configured by a user. Upon determining that proxy server A has reached a processing capacity threshold, remapping module 406 may remap former security channels 411F from authentication proxy server A to authentication proxy server B (420B), resulting in remapped secure channels 411R.

Returning to FIG. 2, method 200 includes an act of remapping the determined one or more secure channels to distribute future authentication requests among the plurality of authentication proxy servers (act 240). For example, remapping module 106 may remap the determined secure channels (e.g. 411R) to distribute future authentication requests among the authentication proxy servers (120A-C). This remapping may be optimized to minimize disruption to authentication proxy users. Thus, former security channels 411F are dropped and those consumers' connections are re-established. The remapping may take into consideration which secure channel remappings will disrupt the fewest amount of consumers. In some embodiments, the remapping may take into account the current state of a supplier server (130A-C). Accordingly, consumers may be connected or remapped to different authentication proxies based on which supplier servers are available to process requests from the proxies.

Turning now to FIG. 3, FIG. 3 illustrates a flowchart of a method 300 for centrally managing authentication affinities among distributed servers using a secure channels affinity service. The method 300 will now be described with frequent reference to the components and data of environments 100 of FIGS. 1 and 400 of FIG. 4.

Method 300 includes an act of receiving at a secure channels affinity service an indication of authentication demand at a plurality of different authentication servers (act 310). For example, a secure channels affinity service (e.g. secure channel management service 106) may receive state inputs 122 that indicate authentication demand at one or more of authentication proxy servers 120A-C. The secure channels affinity service may be configured to determine consumers' affinity mappings as well as manage those mappings. Thus, for instance, if consumer C (115C) has an affinity mapping to authentication proxy server B (120B), the affinity mapping indicates that any authentication requests sent from consumer C will be sent to proxy server B. The secure channel affinity service may be configured to change affinity mappings based on received state information from the authentication proxies.

Method 300 includes an act of the secure channel affinity service determining that one or more authentication affinities of the authentication servers are to be altered according to the received indication of authentication demand (act 320). For example, the secure channel affinity service may determine that authentication affinities are to be altered based on current levels of demand for authentication. Thus, authentication proxy server A (420A) may indicate a very high level of authentication demand being received from consumers A, B & C (415A-C). In this case, the affinity mappings of the consumers may be altered to use other proxy servers to take the load off server A.

Method 300 includes an act of the secure channels affinity service dynamically changing the authentication affinities of at least one of the authentication servers based on the received indication of authentication demand (act 330). For example, the secure channel affinity service may dynamically change the authentication affinities of authentication proxy server A based on an indication that proxy server A has a high level of demand. Changing the affinities regarding consumers B & C may ensure that future authentication requests are sent to proxy servers other than proxy server A (to proxy server B, for example).

In some cases, multiple different secure channel affinity services may be running simultaneously to manage different geographic regions. Additionally or alternatively, a plurality of secure channel affinity services may be running simultaneously to manage different sets of proxy servers, perhaps located in different geographic regions. In some cases, affinities may be changed without knowing the current processing capacity of any of the authentication servers. In such cases, the affinities are changed based on the state information received from the authentication proxies. Alternatively, affinities may be remapped based (solely) on the current state of the supplier servers (e.g. the supplier servers' processor load, memory utilization, network response time and other factors.

Accordingly, methods, systems and computer program products are provided that redistribute authentication requests among multiple different authentication servers and that centrally manage authentication affinities among distributed servers using a secure channels affinity service. The remapping may be performed continually, dynamically and automatically and may be performed in a manner that is least obtrusive to the current users.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and a memory, in a computer networking environment including a plurality of computing systems, a computer-implemented method for redistributing authentication requests among a plurality of authentication servers, the method comprising:
   instantiating a secure channel management service configured to manage one or more secure channel connections, wherein the secure channel management service is configured to receive state inputs from one or more currently deployed authentication proxy servers, the authentication proxy servers being configured to queue authentication requests for transmission to one or more authentication servers;
   receiving an indication of authentication demand from each of a plurality of the authentication proxy servers, the indication of authentication demand that is received from each of the plurality of authentication servers including one or more of the following state inputs: an authentication request quantity, an amount of processing capacity, an amount of current network usage, a quantity of channels currently open, a user defined configuration limit for a corresponding proxy server or an affinity mapping;
   determining that, based on the received indication of authentication demand comprising the state input, one or more of the secure channels are to be remapped to a different authentication proxy server; and
   remapping the determined one or more secure channels to distribute future authentication requests among the plurality of authentication proxy servers according to the determination.

2. The method of claim 1, wherein the authentication requests are generated by consumer servers requesting authentication on a authentication server.

3. The method of claim 1, wherein the proxy servers are configured to queue the received authentication requests for transmission to a supplier server over a secure channel established between the proxy and the supplier server.

4. The method of claim 2, wherein the proxy servers and the consumer servers are within a domain.

5. The method of claim 4, wherein the secure channel management service is configured to run outside the domain.

6. The method of claim 3, wherein the secure channels are remapped based on the current state of the supplier server.

7. The method of claim 4, wherein the state inputs further comprise at least one of the total number of consumers or the number of consumers currently authenticating through the authentication proxy servers in the domain.

8. The method of claim 1, wherein the state inputs further comprise at least one of the total number of proxy servers or the proxy servers' current processing capacity.

9. The method of claim 2, wherein the state inputs comprise the affinity mapping between the consumer servers and the authentication proxy servers.

10. The method of claim 1, wherein the act of determining that one or more of the secure channels are to be remapped to a different authentication proxy server is performed dynamically on a continual basis.

11. The method of claim 1, wherein the act of determining one or more of the secure channels are to be remapped to a different authentication proxy server is performed at predefined intervals.

12. The method of claim 1, wherein the act of determining that one or more of the secure channels are to be remapped to a different authentication proxy server is performed after receiving an alert.

13. The method of claim 12, wherein the received alert comprises an indication that at least one of the authentication proxy servers has reached a processing capacity threshold.

14. The method of claim 1, wherein the act of remapping the determined one or more secure channels to distribute future authentication requests among the plurality of authentication proxy servers is optimized to minimize disruption to authentication proxy users.

15. The method of claim 1, further comprising an act of embedding the current state of the authentication proxy server in communications transmitted by at least one of the authentication proxy servers.

16. A computer program product for implementing a method for centrally managing authentication affinities among distributed servers using a secure channels affinity service, the computer program product comprising one or more computer-readable storage media having stored thereon computer-executable instructions that, when executed by one or more processors of the computing system, cause the computing system to perform the method, the method comprising:

receiving at a secure channels affinity service an indication of authentication demand at a plurality of different authentication servers, the indication of demand being received from each of the plurality of authentication servers and including one or more of the following state inputs: an authentication request quantity, an amount of processing capacity, an amount of current network usage, a quantity of channels currently open, a user defined configuration limit for a corresponding authentication server, or an affinity mapping;

the secure channel affinity service determining that one or more authentication affinities of the authentication servers are to be altered according to the received indication of authentication demand; and the secure channels affinity service dynamically changing the authentication affinities of at least one of the authentication servers based on the received indication of authentication demand, wherein changing the authentication affinities of the at least one of the authentication servers causes future authentication requests to be distributed according to the changed authentication affinities.

17. The computer program product of claim 16, wherein a plurality of secure channel affinity services are running simultaneously to manage different geographic regions.

18. The computer program product of claim 16, wherein a plurality of secure channel affinity services are running simultaneously to manage different sets of servers.

19. The computer program product of claim 16, wherein the authentication affinities are changed according to a predetermined remapping method without knowing the processing capacity of any of the plurality of authentication proxy servers.

20. A computer system comprising the following:
one or more processors;
system memory;
one or more computer-readable storage media having stored thereon computer-executable instructions that, when executed by the one or more processors, causes the computing system to perform a method for redistributing authentication requests among a plurality of authentication servers, the method comprising the following:

receiving at least one state input embedded in a communication from each of a plurality of currently deployed authentication proxy servers, the authentication proxy servers being configured to queue authentication requests for transmission to one or more authentication servers, the state input including at least one of the following: a total number of consumers, a number of consumers currently authenticating through the authentication proxy servers, a total number of proxy servers, the proxy servers' current processing capacity or an affinity mapping between the consumer servers and the authentication proxy servers;

determining that, based on the received embedded state input, one or more of the secure channels are to be remapped to a different authentication server; and remapping the determined one or more secure channels according to one of a plurality of different remapping algorithm to distribute future authentication requests among the plurality of authentication proxy servers according to the determination.

* * * * *